United States Patent [19]
Kimura et al.

[11] Patent Number: 5,834,563
[45] Date of Patent: Nov. 10, 1998

[54] COMPOSITE RUBBER PARTICLES AND GRAFT COPOLYMER PARTICLES OF COMPOSITE RUBBER

[75] Inventors: Katsuhiko Kimura, Akashi; Taizo Aoyama, Takasago, both of Japan

[73] Assignee: Kaneka Corporation, Osaka, Japan

[21] Appl. No.: 852,164

[22] Filed: May 6, 1997

[30] Foreign Application Priority Data

May 8, 1996 [JP] Japan ................................. 8-113697

[51] Int. Cl.[6] ............................................. C08F 255/08
[52] U.S. Cl. ...................... 525/319; 525/191; 525/227; 525/241; 525/310
[58] Field of Search ........................ 525/191, 227, 525/241, 310, 319

[56] References Cited

U.S. PATENT DOCUMENTS

| | | | |
|---|---|---|---|
| 3,458,599 | 7/1969 | Daumiller | 525/319 |
| 3,894,119 | 7/1975 | Forbes | 525/319 |
| 4,154,777 | 5/1979 | Shoji et al. . | |
| 4,384,076 | 5/1983 | Ohara et al. . | |
| 4,481,330 | 11/1984 | Ohara et al. . | |
| 4,500,681 | 2/1985 | Shulman | 525/319 |
| 4,647,619 | 3/1987 | Dean . | |
| 4,894,415 | 1/1990 | Sasaki et al. | 525/68 |
| 4,946,899 | 8/1990 | Kennedy | 525/319 |
| 5,210,148 | 5/1993 | Frechet | 525/319 |
| 5,242,983 | 9/1993 | Kennedy | 525/319 |
| 5,276,094 | 1/1994 | Kaszas | 525/319 |
| 5,395,885 | 3/1995 | Kennedy | 525/319 |
| 5,401,805 | 3/1995 | Chung | 525/310 |
| 5,428,111 | 6/1995 | Faust | 525/319 |
| 5,458,796 | 10/1995 | Storey | 525/319 |
| 5,508,038 | 4/1996 | Wang | 525/191 |
| 5,548,029 | 8/1996 | Powers et al. . | |

FOREIGN PATENT DOCUMENTS

| | | |
|---|---|---|
| 0 332 188 | 9/1989 | European Pat. Off. . |
| 8-30102 | 3/1996 | Japan . |

OTHER PUBLICATIONS

J. P. Kennedy et al., Polymer Bulletin 13, pp. 441–446 (1985).

*Primary Examiner*—Paul R. Michl
*Attorney, Agent, or Firm*—Armstrong, Westerman, Hattori, McLeland & Naughton

[57] ABSTRACT

The present invention provides the composite rubber particles and graft copolymer particles of composite rubber which can be used as the impact modifier being excellent in weather resistance, thermal stability, and particularly impact resistance without substantially lowering transparency of each resin. The composite rubber particles have intertwined molecular chains of the isobutylene polymer and the vinyl polymer so that the both polymers cannot be separated substantially from each other and the graft copolymer particles of composite rubber are prepared by graft-polymerizing at least one vinyl polymer to the above composite rubber particles.

16 Claims, No Drawings

COMPOSITE RUBBER PARTICLES AND GRAFT COPOLYMER PARTICLES OF COMPOSITE RUBBER

TECHNICAL FIELD OF THE INVENTION

The present invention relates to composite rubber particles and graft copolymer particles of composite rubber. More particularly the present invention relates to the composite rubber particles and the graft copolymer particles of composite rubber which can endow various resins with high impact resistance when mixed to those resins and can be used for an impact modifier which has excellent weather resistance and thermal stability and, as occasion demands, makes it possible not to lower substantially inherent transparency of those resins.

BACKGROUND ART

The impact modifier is for endowing various resins with impact resistance, and a variety of such modifiers have been proposed heretofore. As the impact modifier, there is widely industrially used core/shell type graft copolymer particles which are prepared by graft-polymerizing a vinyl monomer (forming a shell layer) to crosslinked particles containing a rubber component (forming a core portion). It is presumed that the rubber component in the core portion endows impact modifying effect and the vinyl polymer in the shell layer endows compatibility (namely, dispersibility) to matrix resin. There is known, for example, an impact modifier which is prepared by graft-polymerizing a vinyl monomer to a polybutadiene rubber having a low glass transition temperature (hereinafter referred to as "Tg"). However, the impact modifier having excellent thermal stability and weather resistance has not been obtained because such a polybutadiene rubber is thermally unstable due to its unsaturated bonds.

Also there is known an impact modifier prepared by graft-polymerizing a vinyl monomer to an acrylic rubber. Such an acrylic rubber is excellent in thermal stability and weather resistance, but since it has a relatively high Tg, significant effect in improving impact resistance cannot be obtained.

JP-A-252613/1985 (JP-B-29303/1994) and JP-A-8209/1990 disclose, as an impact modifier having a Tg lower than that of the above-mentioned acrylic rubber and being excellent in thermal stability and weather resistance, an impact modifier prepared by graft-polymerizing a vinyl monomer to a polyorganosiloxane (namely, silicone) rubber. Though effect of improving impact resistance can be obtained to a certain extent, higher improving effect is required and there is a problem that a matrix resin to which the impact modifier prepared by graft-polymerizing the vinyl monomer to the silicone rubber is added has poor surface gloss.

Further JP-A-6012/1989 and JP-A-100812/1992 disclose, as an impact modifier having excellent thermal stability and weather resistance without lowering surface gloss of a matrix resin, an impact modifier prepared by graft-polymerizing a vinyl monomer to composite rubber particles comprising a silicone rubber and poly(alkyl (meth)acrylate) as an acrylic rubber. However, in such an impact modifier containing the silicone rubber, since the silicone rubber has a low refractive index, there is a problem that transparency of a matrix resin is impaired by adding the silicone rubber.

SUMMARY OF THE INVENTION

The present inventors have made intensive studies in view of the above-mentioned problems, and as a result, have found that it is possible to particularly improve impact resistance of various resins without substantially lowering inherent transparency thereof by using composite rubber particles comprising an isobutylene polymer and a vinyl polymer, molecular chains thereof being intertwined with each other so that said isobutylene polymer and vinyl polymer cannot be separated substantially from each other, and by using graft copolymer particles of composite rubber which are prepared by graft-polymerizing at least one vinyl monomer to such composite rubber particles, and thus have completed the present invention.

Namely, an object of the present invention is to provide the composite rubber particles and the graft copolymer particles of composite rubber which can endow various resins with high impact resistance when mixed to those resins and can be used as an impact modifier which has excellent weather resistance and thermal stability and, as occasion demands, makes it possible not to lower inherent transparency of the resins substantially.

DETAILED DESCRIPTION OF THE INVENTION

The present invention relates to the composite rubber particles comprising the isobutylene polymer and the vinyl polymer, which are characterized in that molecular chains of said isobutylene polymer and vinyl polymer are intertwined with each other so that the both polymers cannot be separated substantially from each other.

The present invention also relates to the graft copolymer particles of composite rubber which are prepared by graft-polymerizing at least one vinyl monomer to the composite rubber particles comprising the isobutylene polymer and the vinyl polymer, in which molecular chains of said isobutylene polymer and vinyl polymer are intertwined with each other so that the both polymers cannot be separated substantially from each other.

The composite rubber particles of the present invention or the composite rubber particles in the graft copolymer particles of composite rubber of the present invention have a major characteristic that the molecular chains of the isobutylene polymer and vinyl polymer are intertwined with each other so that both polymers cannot be separated substantially from each other.

In the present specification, the molecular chains of the isobutylene polymer and vinyl polymer being intertwined with each other so that the both polymers cannot be separated substantially from each other means that for example, three dimensional network structure is formed by chemically bonding those two polymers to each other or by, even if the polymers are not chemically bonded, intertwining the molecular chains of each polymer with each other due to affinity between the molecular chains such as van der Waals force or hydrogen bond, and also includes the meaning that the both polymers cannot be separated substantially, for example, by using a solvent.

Also the graft copolymer particles of composite rubber of the present invention are particles prepared by graft-polymerizing at least one vinyl monomer to the above-mentioned composite rubber particles. Examples thereof are a core/shell type particle having a core portion of the above-mentioned composite rubber particle and a shell layer of the vinyl polymer obtained by graft-polymerizing the above-mentioned vinyl monomer; a non-core/shell type particle resulting from the above-mentioned graft polymerization which occurs even inside the composite rubber particle; and a particle which results from the above-mentioned graft polymerization to link up the composite rubber particles with each other (in this case, each of the composite rubber particles itself maintains particulate form).

The present invention is also characterized in that the composite rubber particles comprise the above-mentioned isobutylene polymer.

In order to prevent lowering of physical properties such as transparency and impact resistance which occurs by separation of the polymers during melt-processing such as extrusion molding and injection molding, according to the present invention, it is necessary that the above-mentioned two polymers cannot be separated.

Also according to the present invention, when the both polymers are mixed to various resins, the isobutylene polymer is necessary from a point of endowing those resins with high impact resistance without substantially lowering inherent transparency and/or weather resistance of the resins, and the vinyl polymer is necessary from a point of adjusting glass transition temperatures (Tg) and refractive indices of the composite rubber particle and graft copolymer particle of composite rubber.

In order to determine that the both polymers cannot be separated, for example, a gel content (amount of insoluble portion in toluene) mentioned hereinafter may be measured. In the present invention, the gel content is not less than 20% (% by weight, hereinafter the same), preferably not less than 40%, more preferably not less than 60%. It is necessary, of course, that the both polymers are contained in the insoluble portion in toluene.

The isobutylene polymer which composes the composite rubber particle means an isobutylene polymer or a polymer which can be prepared by using the isobutylene polymer and if necesssary, a crosslinking agent for the isobutylene polymer (hereinafter referred to as "crosslinking agent A") and a graft-linking agent for the isobutylene polymer (hereinafter referred to as "graft-linking agent A"). Both of the crosslinking agent A and graft-linking agent A are monomers having a plurality of functional groups in one molecule thereof, but the definitions thereof are clearly different. Namely, the crosslinking agent A is one having plural functional groups of the same reactivity, and the graft-linking agent A is one having plural functional groups of different reactivities. In actual functions of both agents, difference in function between them is not clear because there are a case where the crosslinking agent A causes chemical graft linkage between different polymers and a case where the graft-linking agent A causes crosslinkage in the same polymer. The above-mentioned crosslinking agent A is used to produce the crosslinkage of the isobutylene polymer in the composite rubber particle, and the graft-linking agent A is used to produce the chemical graft-linkage between the isobutylene polymer and vinyl polymer in the composite rubber particle or between the isobutylene polymer in the composite rubber particle and the grafted vinyl polymer. However, as mentioned above, there is a case where the graft-linking agent A functions to produce the crosslinkage of the isobutylene polymer in the composite rubber particle.

The above-mentioned isobutylene polymer is a polymer which comprises the unit derived from isobutylene in an amount of not less than 50% of the whole polymer, and preferably has at least one reactive functional group on at least one end of its molecular chain and/or in the molecular chain. Examples of other units contained in the isobutylene polymer are, a unit derived from an initiator used when preparing the isobutylene polymer, a unit derived from a cationically polymerizable monomer which is used, as occasion demands, when preparing the isobutylene polymer, and the like.

Examples of the reactive functional group which can be present on at least one end of the molecular chain of the above-mentioned isobutylene polymer are, for instance, a functional group represented by the formula (1):

$$-R-X \tag{1}$$

wherein R is a divalent hydrocarbon group having 1 to 20 carbon atoms, X is halogen atom, vinyl, allyl, isopropenyl, allyloxy, acryloyl, methacryloyl, epoxy, amino, cyano, isocyano, cyanate, isocyanate, carboxyl, acid anhydride residue, hydroxyl, mercapto or a silicon-containing group represented by the formula (2):

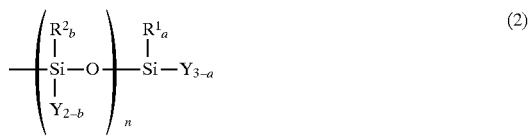

$$-\left(\begin{array}{c} R^2_b \\ | \\ Si-O \\ | \\ Y_{2-b} \end{array}\right)_n \begin{array}{c} R^1_a \\ | \\ Si-Y_{3-a} \end{array} \tag{2}$$

wherein Y is the same or different and each is hydroxyl or a hydrolyzable group, a is 0 or an integer of 1 to 3, b is 0 or an integer of 1 to 2, n is 0 or an integer of 1 to 18, $R^1$ and $R^2$ are the same or different and each is a hydrocarbon group having 1 to 20 carbon atoms or a triorganosiloxy group represented by the formula (3):

$$R^3_3SiO- \tag{3}$$

in which $R^3$ is the same or different and each is a hydrocarbon group having 1 to 20 carbon atoms; provided that X may be directly bonded to the molecular chain end of the isobutylene polymer without R. Among them, allyl and the silicon-containing group are preferable.

Examples of the isobutylene polymer having the reactive functional group on at least one end of its molecular chain are, for instance, a commercially available low molecular weight polyisobutylene oil having an average molecular weight of about 300 to about 5000 (having an isopropenyl group at one end) and generally called "polybutene" such as Nisseki Polybutene HV-3000 (available from Nippon Petrochemicals Co., Ltd.), Nissan Polybutene 200N (available from Nippon Yushi Kabushiki Kaisha) and Idemitsu Polybutene 300R (available from Idemitsu Petrochemical Co., Ltd.); a high molecular weight polyisobutylene having a viscosity average molecular weight of 30000 to 60000 (having an isopropenyl group at one end) and commercially available as "Tetolax" (tradename and available from Nippon Petrochemicals Co., Led.); an isobutylene polymer having allyl at its end(s) disclosed in JP-B-53768/1995; an isobutylene polymer having a silicon-containing group at its end(s) disclosed in JP-B-69659/1992; and the like.

At least one reactive functional group which can be present in the molecular chain of the above-mentioned isobutylene polymer is, for example, a group having unsaturated double bond, and examples of such an isobutylene polymer is, for instance, a copolymer comprising the unit derived from isobutylene monomer and the unit derived from isoprene monomer and generally called "butyl rubber" in commercial market such as JSR Butyl 268 (available from Nippon Synthetic Rubber Co., Ltd.), KALAR5263 and KALENE800 (both available from Hardman Incorporated).

Among those isobutylene polymers, the isobutylene polymer having allyl at its end(s) and/or the isobutylene polymer having the silicon-containing group at its end(s) are preferable from the viewpoints of impact resistance and transparency, and the isobutylene polymer having the silicon-containing group at its end(s) is more preferable.

As the above-mentioned crosslinking agent A and graft-linking agent A, when the reactive functional group of the isobutylene polymer is a group having an unsaturated double bond such as a vinyl group, there may be employed the same agents as the crosslinking agent B and the graft-linking agent B for vinyl monomer which are contained in the vinyl polymer mentioned later.

Also when the reactive functional group of the isobutylene polymer is the silicon-containing group, as the crosslinking agent A, for example, trifunctional silane compounds such as trimethoxymethylsilane and triethoxyphenylsilane; tetrafunctional silane compounds such as tetramethoxysilane, tetraethoxysilane, tetrapropoxysilane and tetrabutoxysilane; and the like are preferable. From the viewpoints of effect improving impact resistance and industrial availability, tetraethoxysilane is particularly preferable. Examples of preferred graft-linking agent A are, for instance, (meth)acrylic functional silane compounds such as β-methacryloyloxyethyldimethoxymethylsilane,
γ-methacryloyloxypropylmethoxydimethylsilane,
γ-methacryloyloxypropyldimethoxymethylsilane,
γ-methacryloyloxypropyltrimethoxysilane,
γ-methacryloyloxypropylethoxydiethylsilane,
γ-methacryloyloxypropyldiethoxymethylsilane,
γ-methacryloyloxypropyltriethoxysilane,
δ-methacryloyloxybutyldiethoxymethylsilane,
γ-acryloyloxypropyldimethoxymethylsilane,
γ-acryloyloxypropyltrimethoxysilane; ethylenic silane compounds such as vinyltrimethoxysilane, vinyldimethoxymethylsilane, vinyltriethoxysilane, p-vinylphenyltrimethoxysilane and p-vinylphenyldimethoxymethylsilane; mercapto functional silane compounds such as γ-mercaptopropyltrimethoxysilane and γ-mercaptopropyldimethoxymethylsilane; and the like. From the viewpoints of effect improving impact resistance and industrial availability, γ-methacryloyloxypropyltrimethoxysilane and γ-methacryloyloxypropyldimethoxymethylsilane are particularly preferable.

Those crosslinking agent A and graft-linking agent A are optional components, and any of them may be used alone or in combination of two or more. An amount of the crosslinking agent A is from 0 to 30 parts (part by weight, hereinafter the same) based on 100 parts of the sum of the isobutylene polymer and the vinyl monomer, and an amount of the graft-linking agent A is from 0 to 30 parts based on 100 parts of the sum of the isobutylene polymer and the vinyl monomer. Even if the amounts of the both agents are more than 30 parts, respectively, the effect improving the impact resistance does not increase and the amount of not more than 30 parts is preferable from economical point of view. When using the crosslinking agent A and the graft-linking agent A together, the total amount of the both agents is from 0 to 30 parts based on 100 parts of the isobutylene polymer. In that case, even if the total amount of the both agents is more than 30 parts, the effect improving the impact resistance does not increase and thus, the amount of not more than 30 parts is preferable from economical point of view.

The vinyl polymer which composes the above-mentioned composite rubber particles means a polymer which can be prepared by using the vinyl monomer mentioned hereinbelow or if necessary, together with a crosslinking agent for the vinyl monomer (hereinafter referred to as "crosslinking agent B") and a graft-linking agent for the vinyl monomer (hereinafter referred to as "graft-linking agent B"). The crosslinking agent B is used to produce the crosslinkage of the vinyl polymer in the composite rubber particle, and the graft-linking agent B is used to produce the chemical graft linkage between the isobutylene polymer and vinyl polymer in the composite rubber particle or between the vinyl polymer in the composite rubber particle and the grafted vinyl polymer. However, as mentioned above, there are also a case where the crosslinking agent B functions to produce the chemical graft linkage between the vinyl polymer and the isobutylene polymer in the composite rubber particle or between the vinyl polymer in the composite rubber particle and the grafted vinyl polymer and a case where the graft-linking agent B functions to produce the crosslinkage of the vinyl polymer in the composite rubber particle.

Examples of the above vinyl monomer are various vinyl monomers, for instance, acrylates such as methyl acrylate, ethyl acrylate, n-propyl acrylate, n-butyl acrylate, 2-ethylhexyl acrylate and n-octyl acrylate; methacrylates such as methyl methacrylate, ethyl methacrylate, butyl methacrylate, 2-ethylhexyl methacrylate, cyclohexyl methacrylate and benzyl methacrylate; aromatic alkenyl compounds such as styrene, α-methylstyrene, p-methylstyrene and vinyltoluene; and cyanided vinyl compounds such as acrylonitrile and methacrylonitrile. Those are used alone or in a mixture of two or more. Among those vinyl monomers, n-butyl acrylate and/or styrene are preferable from the point that Tg and refractive index of the composite rubber particles are adjusted easily.

Examples of the above-mentioned crosslinking agent B are, for instance, ethylene glycol dimethacrylate, propylene glycol dimethacrylate, 1,3-butylene glycol dimethacrylate, 1,4-butylene glycol dimethacrylate, divinylbenzene and the like. From the points of effect improving impact resistance and industrial availability, ethylene glycol dimethacrylate and divinylbenzene are preferable.

Examples of the above-mentioned graft-linking agent B are, for instance, allyl methacrylate, triallyl cyanurate, triallyl isocyanurate and the like. From the points of effect improving impact resistance and industrial availability, allyl methacrylate is preferable.

Those crosslinking agent B and graft-linking agent B are optional components, and any of them may be used alone or in combination of two or more thereof. An amount of the crosslinking agent B is from 0 to 30 parts based on 100 parts of the sum of the isobutylene polymer and the vinyl monomer, and an amount of the graft-linking agent B is from 0 to 30 parts based on 100 parts of the sum of the isobutylene polymer and the vinyl monomer. Even if the amounts of the both agents are more than 30 parts, respectively, the effect improving the impact resistance does not increase and thus, the amount of not more than 30 parts is preferable from economical point of view. When using the crosslinking agent B and the graft-linking agent B together, the total amount of the both agents is from 0 to 30 parts based on 100 parts of the isobutylene polymer. In that case, even if the total amount of the both agents is more than 30 parts, the effect improving the impact resistance does not increase and thus, the amount of not more than 30 parts is preferable from economical point of view. Further, it is preferable that the total amount of the crosslinking agent B, graft-linking agent B, crosslinking agent A and graft-linking agent A is from 0.1 to 30 parts. When the total amount is less than 0.1 part, there is a tendency that it is difficult to obtain the composite rubber particles of the present invention, in which molecular chains of the isobutylene polymer and vinyl polymer are intertwined with each other so that the both polymers cannot be separated from each other.

The percentages of the isobutylene polymer and the vinyl polymer in the above-mentioned composite rubber particles can be adjusted as needed. The percentages of the isobutylene polymer and the vinyl polymer in the above-mentioned composite rubber particles can be adjusted optionally depending on required Tg and/or refractive index in such a range that an amount of the isobutylene polymer in the above-mentioned composite rubber particles is from 1 to 99% and an amount of the vinyl polymer in the above-mentioned composite rubber particles is from 99 to 1%.

It is preferable that an average particle size of the above-mentioned composite rubber particles is in the range of from 0.05 to 10 μm. In the case where the average particle size is more than and less than the above-mentioned range, the effect improving impact resistance tends to become insufficient.

A process for preparing such composite rubber particles is not limited, and, for example, microsuspension polymerization process is preferable. According to the microsuspension polymerization process, for example, a composite rubber latex containing the composite rubber particles can be obtained by preparing a mixture of the above-mentioned isobutylene polymer, vinyl monomer, usual radical polymerization initiator and as occasion demands, the above crosslinking agent A and/or graft-linking agent A and crosslinking agent B and/or graft-linking agent B, mixing with water in the presence of an emulsifying agent and further as occasion demands, a dispersion stabilizer such as higher alcohol with shearing by means of a homogenizer to produce emulsion or dispersion state, and then polymerizing. In that case, when the isobutylene polymer having the silicon-containing group at its end(s) is used as the isobutylene polymer, it is possible to accelerate condensation reaction of the silicon-containing group by making the reaction system acidic by using an inorganic acid such as hydrochloric acid, sulfuric acid or nitric acid or an organic acid having surface activating ability such as alkylbenzenesulfonic acid, alkylsulfonic acid or alkylsulfuric ester. With advance of the above-mentioned microsuspension polymerization, the isobutylene polymer and the vinyl polymer form the network structure as mentioned above to give the composite rubber particles, in which the both polymers cannot be separated from each other substantially.

The composite rubber particles in the rubber latex thus prepared can be graft-polymerized with the vinyl monomer exemplified hereinbelow. In the present invention, for the purpose of further enhancing compatibility with various resins to be improved in impact resistance, it is possible to graft-polymerize the vinyl monomer for graft polymerization to the above-mentioned composite rubber particles.

Examples of the vinyl monomer for graft polymerization are acrylates such as methyl acrylate, ethyl acrylate, n-propyl acrylate, n-butyl acrylate, 2-ethylhexyl acrylate and n-octyl acrylate; methacrylates such as methyl methacrylate, ethyl methacrylate, butyl methacrylate, 2-ethylhexyl methacrylate, cyclohexyl methacrylate and benzyl methacrylate; aromatic alkenyl compounds such as styrene, α-methylstyrene, p-methylstyrene and vinyltoluene; and cyanided vinyl compounds such as acrylonitrile and methacrylonitrile. Those are used alone or in a mixture of two or more. Among those vinyl monomers for graft polymerization, preferred one can be selected depending on combination with various resins to be improved in impact resistance.

Also as occasion demands, the crosslinking agent B and/or graft-linking agent B may be used alone or in a mixture of two or more in the above-mentioned graft polymerization. The total amount of the crosslinking agent B and/or graft-linking agent B is from 0 to 20 parts based on 100 parts of the vinyl monomer for graft polymerization which is used in the graft polymerization.

The percentages of the above-mentioned composite rubber particles and vinyl monomer for graft polymerization in the graft copolymer particles of composite rubber of the present invention are not limited particularly. It is preferable that the amount of the composite rubber particles is from 30 to 95%, more preferably from 40 to 90% and the amount of the vinyl monomer for graft polymerization is from 5 to 70%, more preferably from 10 to 60% based on the weight of the graft copolymer particles of composite rubber. When the amount of the vinyl monomer for graft polymerization is less than 5%, dispersing of the graft copolymer particles of composite rubber into thermoplastic resins tends to become insufficient, and when more than 70%, the effect improving impact resistance tends to be lowered. A graft conversion of the vinyl monomer for graft polymerization is not particularly limited in the graft copolymer particles of composite rubber of the present invention, and is preferably not less than 30%, more preferably not less than 50%. When the graft efficiency is less than 30%, dispersing of the graft copolymer particles of composite rubber into thermoplastic resins tends to become insufficient.

The graft copolymer particles of composite rubber of the present invention may be preferably prepared, for example, by adding the vinyl monomer for graft polymerization to the composite rubber latex, subjecting to radical polymerization in single-staged or multi-staged graft polymerization, and then salting out the graft copolymer latex of composite rubber to separate and recover the graft copolymer particles of composite rubber. When the isobutylene polymer having the silicon-containing group at its end(s) is used as the isobutylene polymer and the reaction system is made acidic, the above-mentioned composite rubber latex may be neutralized by adding an aqueous solution of alkali such as sodium hydroxide, potassium hydroxide or sodium carbonate prior to the graft polymerization.

The composite rubber particles and graft copolymer particles of composite rubber themselves which are obtained through the above-mentioned process can be materials for molding as resins having impact resistance. They are very useful as an impact modifier because, when mixed with various thermoplastic resins, they can endow thermoplastic resins with high impact resistance. Further, they cannot substantially lower inherent transparency of the thermoplastic resins.

Examples of the above thermoplastic resin, to which the composite rubber particles and graft copolymer particles of composite rubber of the present invention are added for improvement of impact resistance, are, for instance, poly(methyl methacrylate), poly(vinyl chloride), polyethylene, polypropylene, cyclic polyolefin, polycarbonate, polyester, and a resin mixture of polycarbonate and polyester; homopolymer or copolymer obtained by polymerizing 70 to 100% of at least one vinyl monomer selected from aromatic alkenyl compound, cyanided vinyl compound and (meth)acrylate with 0 to 30% of other vinyl monomer such as ethylene, propylene or vinyl acetate which is copolymerizable with the above vinyl monomer and/or a diene monomer such as butadiene or isoprene; polystyrene, poly(phenylene ether) and a resin mixture of polystyrene and poly(phenylene ether); and the like. Among those thermoplastic resins, poly(methyl methacrylate, poly(vinyl chloride), polypropylene and cyclic polyolefin are preferable from the point that characteristics such as transparency, weather resistance and impact resistance are exhibited easily.

As a process for obtaining a resin composition by adding the composite rubber particles and graft copolymer particles of composite rubber of the present invention to the above thermoplastic resin, there can be exemplified a process for forming into pellets through mechanical mixing by using conventional equipment such as Banbury mixer, roll mill and biaxial extruder. The extruded pellets can be molded in a wide temperature range. For molding, usual injection molding machine, blow molding machine, extrusion molding machine or the like is available.

Further, to that resin composition can be added, as occasion demands, usual additives such as stabilizer, plasticizer, lubricant, flame retardant, pigment and filler. Examples of the additives are stabilizer such as triphenyl phosphite; the lubricant such as polyethylene wax or polypropylene wax; the phosphate flame retardant such as triphenyl phosphate or tricresyl phosphate; bromine-containing flame retardant such as decabromobiphenyl or decabromobiphenyl ether; other flame retardant such as antimony trioxide; the pigment such as titanium oxide, zinc sulfide or zinc oxide; and the filler such as glass fiber, asbestos, wollastonite, mica or talc.

The preferred examples of the composite rubber particles of the present invention are, for instance, those mentioned below.

The composite rubber particles comprising:
(A) isobutylene polymer,
(B) graft-linking agent A,
(C) vinyl monomer, and
(D) graft-linking agent B.

The composite rubber particles are advantageous from the viewpoints of impact resistance, transparency, weather resistance and thermal stability.

More preferably the composite rubber particles comprising:
(A1) isobutylene polymer having allyl group at its end(s) and/or isobutylene polymer having the silicon-containing group at its end(s),
(B1) graft-linking agent A comprising γ-methacryloyloxypropyltrimethoxysilane and/or γ-methacryloyloxypropyldimethoxymethylsilane,
(C1) vinyl monomer comprising n-butyl acrylate and/or styrene, and
(D1) allyl methacrylate.

The composite rubber particles are advantageous from the point that Tg and refractive index can be adjusted over a wide range.

Also the preferred examples of the graft copolymer particles of composite rubber of the present invention are, for instance, those mentioned below.

The graft copolymer particles of composite rubber obtained by graft-polymerizing:
(E) vinyl monomer for graft polymerization to the composite rubber particles comprising:
(A) isobutylene polymer,
(B) graft-linking agent A,
(C) vinyl monomer, and
(D) graft-linking agent B.

The graft copolymer particles of composite rubber are advantageous from the viewpoints of impact resistance, transparency, weather resistance, thermal stability and dispersibility to various resins.

More preferably the graft copolymer particles of composite rubber obtained by graft-polymerizing:
(E1) vinyl monomer for graft polymerization comprising methyl methacrylate and/or styrene to the composite rubber particles comprising:
(A1) isobutylene polymer having allyl group at its end(s) and/or isobutylene polymer having a silicon-containing group at its end(s),
(B1) graft-linking agent A comprising γ-methacryloyloxypropyltrimethoxysilane and/or γ-methacryloyloxypropyldimethoxymethylsilane,
(C1) vinyl monomer comprising n-butyl acrylate and/or styrene, and
(D1) allyl methacrylate.

The graft copolymer particles of composite rubber are advantageous from points that Tg and refractive index can be adjusted over a wide range and that dispersibility to various resins is good.

The present invention is then explained by referring to Examples, but is not limited thereto.

Measurements of physical properties in Examples and Comparative Examples were carried out in the manner mentioned below.

Gel content: Composite rubber particles were immersed in toluene for eight hours with stirring at room temperature, followed by centrifuging at 12,000 rpm for 60 minutes to measure a weight percentage of toluene-insoluble portion of the composite rubber particles.

PIB content in gel: A weight percentage of the isobutylene polymer component in toluene-insoluble portion was calculated according to ratio of intensity at 1370 $cm^{-1}$ and 1730 $cm^{-1}$ of FTIR spectrum with respect to toluene-insoluble portion of composite rubber particles.

Graft efficiency: Gel content of the graft copolymer particles of composite rubber was measured in the same manner as that of the composite rubber particles, and a ratio of increase in amount of toluene-insoluble portion due to graft polymerization was calculated on the basis of the added vinyl monomer for graft polymerization.

Haze: Measured in accordance with ASTM D1003.

Gardner impact: Measurement was made by using a weight of 700 g at 23° C. in accordance with ASTM D3029-GB.

Izod impact strength: Measurement was made by using a sample with a V-shaped notch at 23° C. in accordance with ASTM D256-56.

Weather resistance: After exposing in a sunshine weather-Ometer (63° C., rain) for 500 hours and 1000 hours, Izod impact strength (notch) was measured in the same manner as above.

EXAMPLE 1

Sixty parts of polybutene HV-3000 (available from Nippon Sekiyu Kagaku Kabushiki Kaisha) as the isobutylene polymer, 40 parts of n-butyl acrylate as the vinyl monomer, 1 part of allyl methacrylate as the graft-linking agent B and 0.5 part of 2,2 -azobis(2,4-dimethyl valeronitrile) as the radical polymerization initiator were mixed, and the mixture was added to 200 parts of water which contains 1.4 parts of sodium lauryl sulfate as an emulsifying agent. After pre-dispersing at 30,000 rpm by a homomixer, the mixture was emulsified and dispersed at a pressure of 700 $kg/cm^2$ by a high pressure homogenizer. The obtained mixture was transferred into a separable flask equipped with a condenser, nitrogen feeding tube and stirrer, followed by heating at 70° C. for five hours with stirring at 200 rpm in nitrogen stream to give a composite rubber latex. The conversion was 99%. The gel content of the obtained composite rubber particles and PIB content in the gel are shown in Table 1.

The composite rubber latex was collected so that the solid content of the composite rubber latex would be 70 parts, and then put in a separable flask equipped with a condenser, nitrogen feeding tube, dropping funnel and stirrer. Then to the flask were added 260 parts of water, 0.001 part of ferrous sulfate, 0.004 part of disodium ethylenediaminetetraacetate and 0.1 part of sodium formaldehyde sulfoxylate. The mixture was heated to 70° C. with stirring at 200 rpm in nitrogen stream.

Subsequently, 30 parts of methyl methacrylate as the vinyl monomer for graft polymerization and 0.06 part of cumene hydroperoxide as the radical polymerization initiator were put in the dropping funnel, and added dropwise to the composite rubber latex over two hours, followed by stirring at 70° C. for one hour. The conversion was 99%. To the obtained graft copolymer latex of composite rubber was added dropwise 30 parts of an aqueous solution of 10% calcium chloride, followed by solidifying, separating, washing and then drying at 40° C. for 15 hours to give a powder of graft copolymer particles of composite rubber (hereinafter referred to as "S-1"). A graft efficiency and average particle size of the obtained S-1 are shown in Table 1.

Subsequently 16 parts of the obtained S-1 was mixed to 84 parts of a commercially available methacrylate resin (Parapet G1000 available from Kuraray Co., Ltd.) to give a thermoplastic resin composition. The resin composition was then extruded and kneaded at 230° C. with a biaxial extruder with a vent (32 mm, L/D=25.5) to give pellets. The obtained pellets were dried at 80° C. for 15 hours and then subjected to injection molding at 230° C. to give a sample plate of 3 mm (thick)×120 mm×120 mm for evaluation of physical properties. The haze and Gardner impact of the obtained sample plate are shown in Table 1.

EXAMPLE 2

Graft copolymer particles of composite rubber (hereinafter referred to as "S-2") were obtained in the same manner as in Example 1 except that isobutylene polymer having allyl group at its end(s) (a polymer having an average molecular weight of 10,400 and prepared by the process mentioned in Japanese Examined Patent Publication No. 53768/1995) was used as the isobutylene polymer. Physical properties thereof were measured in the same manner as in Example 1. The results are shown in Table 1.

EXAMPLE 3

Sixty parts of isobutylene polymer having the silicon-containing group at its end(s) (a polymer having an average molecular weight of 10,000 and prepared by the process mentioned in Japanese Examined Patent Publication No. 69659/1992) as the isobutylene polymer, 40 parts of n-butyl acrylate as the vinyl monomer, 1 part of γ-methacryloyloxypropyltrimethoxysilane as the graft-linking agent A, 1 part of allyl methacrylate as the graft-linking agent B and 0.5 part of 2,2'-azobis(2,4-dimethyl valeronitrile) as the radical polymerization initiator were mixed, and the mixture was added to 200 parts of water which contains 1.9 parts of sodium dodecylbenzene-sulfonate as an emulsifying agent. After pre-dispersing at 30,000 rpm by a homomixer, the mixture was emulsified and dispersed at a pressure of 700 kg/cm² by a high pressure homogenizer. The obtained mixture was transferred into a separable flask equipped with a condenser, nitrogen feeding tube and stirrer, followed by adding 0.2 part of concentrated hydrochloric acid with stirring at 200 rpm in nitrogen stream and then heating at 70° C. for five hours to give a composite rubber latex The conversion was 95%. The gel content of the obtained composite rubber and PIB content in the gel are shown in Table 1.

The composite rubber latex was collected so that the solid content of the composite rubber latex would be 70 parts, and then put in a separable flask equipped with a condenser, nitrogen feeding tube, dropping funnel and stirrer. Then to the flask were added a 5N aqueous solution of sodium hydroxide until pH of the composite rubber latex became 7, followed by adding 260 parts of water, 0.001 part of ferrous sulfate, 0.004 part of disodium ethylenediaminetetraacetate and 0.1 part of sodium formaldehyde sulfoxylate. The mixture was heated to 70° C. with stirring at 200 rpm in nitrogen stream.

Subsequently, 30 parts of methyl methacrylate as the vinyl monomer for graft polymerization and 0.06 part of cumene hydroperoxide as the radical polymerization initiator were put in the dropping funnel, and added dropwise to the composite rubber latex over two hours, followed by stirring at 70° C. for one hour. The conversion was 99%. To the obtained graft copolymer latex of composite rubber was added dropwise 30 parts of an aqueous solution of 10% calcium chloride, followed by solidifying, separating, washing and then drying at 40° C. for 15 hours to give a powder of graft copolymer particles of composite rubber (hereinafter referred to as "S-3"). A graft efficiency and average particle size of the obtained S-3 are shown in Table 1.

Subsequently 16 parts of the obtained S-3 was mixed to 84 parts of a commercially available methacrylate resin (Parapet G1000 available from Kuraray Co., Ltd.) to give a thermoplastic resin composition. The resin composition was then extruded and kneaded at 230° C. with a biaxial extruder with a vent (32 mm, L/D=25.5) to give pellets. The obtained pellets were dried at 80° C. for 15 hours and then subjected to injection molding at 230° C. to give a sample plate of 3 mm (thick)×120 mm×120 mm for evaluation of physical properties. The haze and Gardner impact of the obtained sample plate are shown in Table 1.

EXAMPLE 4

Graft copolymer particles of composite rubber (hereinafter referred to as "S-4") were obtained in the same manner as in Example 3 except that the amounts of the graft-linking agents A and B were both 0.5 part. Physical properties thereof were measured in the same manner as in Example 1. The results are shown in Table 1.

COMPARATIVE EXAMPLE 1

The same procedures as in Example 1 were repeated except that a commercially available acrylic impact modifier (KANE ACE FM-21 available from Kaneka Corporation) was used instead of S-1. The physical properties of the obtained sample plate were measured in the same manner as in Example 1. The results are shown in Table 1.

TABLE 1

|  | Ex. 1 | Ex. 2 | Ex. 3 | Ex. 4 | Com. Ex. 1 |
|---|---|---|---|---|---|
| Composite rubber particles | | | | | |
| Isobutylene polymer | | | | | |
| HV-3000 (part by weight) | 60 | — | — | — | — |
| AL-PIB (part by weight) | — | 60 | — | — | — |
| Si-PIB (part by weight) | — | — | 60 | 60 | — |
| Vinyl monomer BA (part by weight) | 40 | 40 | 40 | 40 | — |
| Graft-linking agent A TSMA (part by weight) | — | — | 1 | 0.5 | — |
| Graft-linking agent B ALMA (part by weight) | 1 | 1 | 1 | 0.5 | — |
| Gel content (% by weight) | 40 | 50 | 85 | 80 | — |
| PIB content in gel (% by weight) | 50 | 60 | 60 | 60 | — |
| Graft copolymer particles of composite rubber | | | | | |
| Composite rubber latex Solid content (part by weight) | 70 | 70 | 70 | 70 | — |
| Vinyl monomer MMA (part by weight) | 30 | 30 | 30 | 30 | — |
| Graft efficiency (% by weight) | 70 | 80 | 99 | 99 | — |
| Average particle size (μm) | 0.2 | 0.4 | 0.4 | 0.4 | — |
| Thermoplastic resin composition | | | | | |
| Thermoplastic resin PMMA (part by weight) | 84 | 84 | 84 | 84 | 84 |
| Impact modifier | | | | | |
| S-1 (part by weight) | 16 | — | — | — | — |
| S-2 (part by weight) | — | 16 | — | — | — |
| S-3 (part by weight) | — | — | 16 | — | — |
| S-4 (part by weight) | — | — | — | 16 | — |
| FM-21 (part by weight) | — | — | — | — | 16 |
| Haze (3 mm thick) (%) | 20.0 | 16.0 | 8.0 | 10.0 | opaque |
| Gardner impact (23° C.) (kgcm) | 32 | 33 | 35 | 37 | 25 |

EXAMPLE 5

Seventy parts of isobutylene polymer having the silicon-containing group at its end(s) (a polymer having an average molecular weight of 10,000 and prepared by the process mentioned in Japanese Examined Patent Publication No. 69659/1992) as the isobutylene polymer, 30 parts of styrene as the vinyl monomer, 1 part of γ-methacryloyloxypropyltrimethoxysilane as the graft-linking agent A, 1 part of allyl methacrylate as the graft-linking agent B and 0.5 part of 2,2'-azobis(2,4-dimethyl valeronitrile) as the radical polymerization initiator were mixed, and the mixture was added to 200 parts of water which contains 1.9 parts of sodium dodecylbenzene-sulfonate as the emulsifying agent. After pre-dispersing at 30,000 rpm by a homomixer, the mixture was emulsified and dispersed at a pressure of 700 kg/cm² by a high pressure homogenizer. The obtained mixture was transferred into a separable flask equipped with a condenser, nitrogen feeding tube and stirrer, followed by adding 0.2 part of concentrated hydrochloric acid with stirring at 200 rpm in nitrogen stream and then heating at 70° C. for five hours to give a composite rubber latex. The conversion was 95%. The gel content of the obtained composite rubber particles and PIB content in the gel are shown in Table 2.

The composite rubber latex was collected so that the solid content in the composite rubber latex would be 70 parts, and then put in a separable flask equipped with a condenser, nitrogen feeding tube, dropping funnel and stirrer. Then to the flask were added a 5N aqueous solution of sodium hydroxide until pH of the composite rubber latex became 7, followed by adding 260 parts of water, 0.001 part of ferrous sulfate, 0.004 part of disodium ethylenediaminetetraacetate and 0.1 part of sodium formaldehyde sulfoxylate. The mixture was heated to 70° C. with stirring at 200 rpm in nitrogen stream.

Subsequently 16.5 parts of methyl methacrylate and 13.5 parts of styrene as the vinyl monomers for graft polymerization and 0.06 part of cumene hydroperoxide as the radical polymerization initiator were put in the dropping funnel, and added dropwise to the composite rubber latex over two hours, followed by stirring at 70° C. for one hour. The conversion was 98%. To the obtained graft copolymer latex of composite rubber was added dropwise 30 parts of an aqueous solution of 10% calcium chloride, followed by solidifying, separating, washing and then drying at 40° C. for 15 hours to give a powder of graft copolymer particles of composite rubber (hereinafter referred to as "S-5"). A graft conversion and average particle size of the obtained graft copolymer particles of composite rubber are shown in Table 2.

Subsequently 10 parts of the obtained S-5 was admixed to a mixture of 100 parts of a commercially available vinyl chloride resin (S1008 available from Kaneka Corporation), 3 parts of dibutyltinmaleate and 0.5 part of stearic acid to give a thermoplastic resin composition. The resin composition was then kneaded at 180° C. for eight minutes with rolls. The obtained kneaded composition was subjected to heat press at 190° C. to give a 3 mm thick sheet. The haze, Izod impact strength and weather resistance of the obtained sheet are shown in Table 2.

COMPARATIVE EXAMPLE 2

The same procedures as in Example 5 were repeated except that a commercially available acrylic impact modifier (KANE ACE FM-21 available from Kaneka Corporation) was used instead of S-5. The physical properties of the obtained sample sheet were measured in the same manner as in Example 5. The results are shown in Table 2.

EXAMPLE 6

Seventy parts of isobutylene polymer having the silicon-containing group at its end(s) (a polymer having an average molecular weight of 10,000 and prepared by the process mentioned in Japanese Examined Patent Publication No. 69659/1992) as the isobutylene polymer, 30 parts of styrene as the vinyl monomer, 1 part of γ-methacryloyloxypropyltrimethoxysilane as the graft-linking agent A, 1 part of allyl methacrylate as the graft-linking agent B and 0.5 part of 2,2 -azobis(2,4-dimethyl valeronitrile) as the radical polymerization initiator were mixed, and the mixture was added to 200 parts of water which contains 1.9 parts of sodium dodecylbenzene-sulfonate as the emulsifying agent. After pre-dispersing at 30,000 rpm by a homomixer, the mixture was emulsified and dispersed at a pressure of 700 kg/cm² by a high pressure homogenizer. The obtained mixture was transferred into a separable flask equipped with a condenser, nitrogen feeding tube and stirrer, followed by adding 0.2 part of concentrated hydrochloric acid with stirring at 200 rpm in nitrogen stream and then heating at 70° C. for five hours to give a composite rubber latex. The conversion was 95%. To the obtained composite rubber latex was added a 5N aqueous solution of sodium hydroxide until pH of the composite rubber latex became 7. Further to the neutralized composite rubber latex was added dropwise 30 parts of aqueous solution of 10% calcium chloride, followed by solidifying, separating, washing and then drying at 40° C. for 15 hours to give a crumb of composite rubber particles (hereinafter referred to as "S-6"). The gel content of the obtained composite rubber particles and PIB content in the gel are shown in Table 2.

Subsequently 20 parts of the obtained S-6 was mixed to 100 parts of a commercially available cyclic polyolefin (Apel 6013 available from Mitsui Sekiyu Kagaku Kogyo Kabushiki Kaisha) to give a thermoplastic resin composition. The resin composition was then extruded and kneaded at 260° C. to give pellets. The obtained pellets were dried at 80° C. for 15 hours and then subjected to injection molding at 260° C. to give sample plates of 1 mm (thick)×120 mm×120 mm and 3 mm (thick)×120 mm×120 mm. The haze (the 1 mm thick sample plate was used) and Izod impact strength (the 3 mm thick sample plate was used) are shown in Table 2.

COMPARATIVE EXAMPLE 3

The same procedures as in Example 6 were repeated except that a commercially available MBS resin (KANE ACE B-582 available from Kaneka Corporation) was used instead of S-6. The physical properties of the sample plates were measured in the same manner as in Example 6. The results are shown in Table 2.

TABLE 2

| | Ex. 5 | Com. Ex. 2 | Ex. 6 | Com. Ex. 3 |
|---|---|---|---|---|
| Composite rubber particles | | | | |
| Isobutylene polymer Si-PIB (part by weight) | 70 | — | 70 | — |
| Vinyl monomer St (part by weight) | 30 | — | 30 | — |
| Graft-linking agent A TSMA (part by weight) | 1 | — | 1 | — |
| Graft-linking agent B ALMA (part by weight) | 1 | — | 1 | — |
| Gel content (% by weight) | 90 | — | 90 | — |
| PIB content in gel (% by weight) | 70 | — | 70 | — |
| Average particle size (μm) | — | — | 0.5 | — |
| Graft copolymer particles of composite rubber | | | | |
| Composite rubber latex Soid content (part by weight) | 70 | — | — | — |
| Vinyl monomer | | | | |
| MMA (part by weight) | 16.5 | — | — | — |
| St (part by weight) | 13.5 | — | — | — |
| Graft efficiency (% by weight) | 99 | — | — | — |
| Average particle size (μm) | 0.5 | — | — | — |
| Thermoplastic resin composition | | | | |
| Thermoplastic resin | | | | |
| PVC (part by weight) | 100 | 100 | — | — |
| COC (part by weight) | — | — | 100 | 100 |
| Impact modifier | | | | |
| S-5 (part by weight) | 10 | — | — | — |
| S-6 (part by weight) | — | — | 20 | — |
| FM-21 (part by weight) | — | 10 | — | — |
| B-582 (part by weight) | — | — | — | 20 |
| Haze (3 mm thick) (%) | 8.0 | opaque | — | — |
| Haze (1 mm thick) (%) | — | — | 10.0 | 15.0 |
| Izod impact strength (23° C.) (kgcm/cm²) | 50 | 35 | 30 | 3 |
| Weather resistance | | | | |
| 500 hours (kgcm/cm²) | 30 | 20 | — | — |
| 1000 hours (kgcm/cm²) | 20 | 10 | — | — |

Abbreviations in Tables 1 and 2 indicate the followings.
HV-3000: Polybutene HV-3000 available from Nippon Sekiyu Kagaku Kabushiki Kaisha
AL-PIB: Isobutylene polymer having allyl group at its end(s)
Si-PIB: Isobutylene polymer having the silicon-containing group at its end(s)
BA: n-Butyl acrylate
St: Styrene
TSMA: γ-Methacryloyloxypropyltrimethoxysilane
ALMA: Allyl methacrylate
MMA: Methyl methacrylate
PMMA: Methacrylate resin "Parapet GIOQO" available from Kabushiki Kaisha Kuraray
PVC: Vinyl chloride resin "S1008" available from Kaneka Corporation
COC: Cyclic polyolefin "Apel 6013" available from Mitsui Sekiyu Kagaku Kogyo Kabushiki Kaisha
S-1: Graft copolymer particles of composite rubber obtained in Example 1 of the present invention
S-2: Graft copolymer particles of composite rubber obtained in Example 2 of the present invention
S-3: Graft copolymer particles of composite rubber obtained in Example 3 of the present invention
S-4: Graft copolymer particles of composite rubber obtained in Example 4 of the present invention
S-5: Graft copolymer particles of composite rubber obtained in Example 5 of the present invention
S-6: Graft copolymer particles of composite rubber obtained in Example 6 of the present invention
FM-21: Acrylic impact modifier "KANE ACE FM-21" available from Kaneka Corporation
B-582: MBS resin "KANE ACE B-582" available from Kaneka Corporation As it is clear from Tables 1 and 2, by mixing the composite rubber particles or the graft copolymer particles of the present invention as the impact modifier to commercially available thermoplastic resins, the thermoplastic resin compositions having improved impact resistance can be obtained without impairing inherent transparency and weather resistance of the resins.

As mentioned above, the composite rubber particles and the graft copolymer particles of composite rubber of the present invention have very remarkable industrial value as the impact modifier which has excellent weather resistance and thermal stability, because they can endow various resins with high impact resistance when mixed to those resins and because they can, as occasion demands make it possible not to substantially lower inherent transparency of those resins.

What we claim is:

1. A latex of composite rubber particles, wherein said composite rubber particles comprise an isobutylene polymer and a vinyl polymer, molecular chains of said isobutylene polymer and vinyl polymer are intertwined with each other so that the both polymers cannot be separated substantially from each other, and an average particle size of said composite rubber particles is in the range of from 0.05 to 10 μm.

2. The latex of claim 1 wherein a gel content of the particle is not less than 20% by weight.

3. The latex of claim 1, which comprise 1 to 99% by weight of the isobutylene polymer and 99 to 1% by weight of the vinyl polymer.

4. The latex of claim 1, wherein said isobutylene polymer has allyl group and/or a silicon-containing group on at least one end of its molecular chain.

5. Graft copolymer particles of composite rubber, wherein at least one vinyl monomer is graft-polymerized to composite rubber particles, said composite rubber particles comprise an isobutylene polymer and a vinyl polymer, molecular chains of said isobutylene polymer and vinyl polymer are intertwined with each other so that the both polymers cannot be separated substantially from each other, and an average particle size of said composite rubber particles is in the range of from 0.05 to 10 µm.

6. The graft copolymer particles of composite rubber of claim 5, wherein a gel content of said composite rubber particles is not less than 20% by weight.

7. The graft copolymer particles of composite rubber of claim 5, wherein said composite rubber particles comprise 1 to 99% by weight of the isobutylene polymer and 99 to 1% by weight of the vinyl polymer.

8. The graft copolymer particles of composite rubber of claim 5, wherein said isobutylene polymer has allyl group and/or a silicon-containing group on at least one end of its molecular chain.

9. The graft copolymer particles of composite rubber of claim 5, wherein an amount of the composite rubber particles is from 30 to 95% by weight on the basis of the weight of the graft copolymer particles of composite rubber.

10. The graft copolymer particles of composite rubber of claim 5, wherein a graft efficiency of the vinyl monomer used for graft polymerization of the composite rubber particles is not less than 30% by weight.

11. A latex of graft copolymer particles of composite rubber, wherein at least one of vinyl monomers is graft-polymerized to composite rubber particles, said composite rubber particles comprise an isobutylene polymer and a vinyl polymer, molecular chains of said isobutylene polymer and vinyl polymer are intertwined with each other so that the both polymers cannot be separated substantially from each other, and an average particle size of said composite rubber particles is in the range of from 0.05 to 10 µm.

12. The latex of claim 11, wherein a gel content of said composite rubber particles is not less than 20% by weight.

13. The latex of claim 11, wherein said composite rubber particles comprise 1 to 99% by weight of the isobutylene polymer and 99 to 1% by weight of the vinyl polymer.

14. The latex of claim 11, wherein said isobutylene polymer has allyl group and/or a silicon-containing group on at least one end of its molecular chain.

15. The latex of claim 11, wherein an amount of the composite rubber particles is from 30 to 95% by weight on the basis of the weight of the graft copolymer particles of composite rubber.

16. The latex of claim 11, wherein a graft efficiency of the vinyl monomer used for graft polymerization of the composite rubber particles is not less than 30% by weight.

* * * * *